Figure 1:
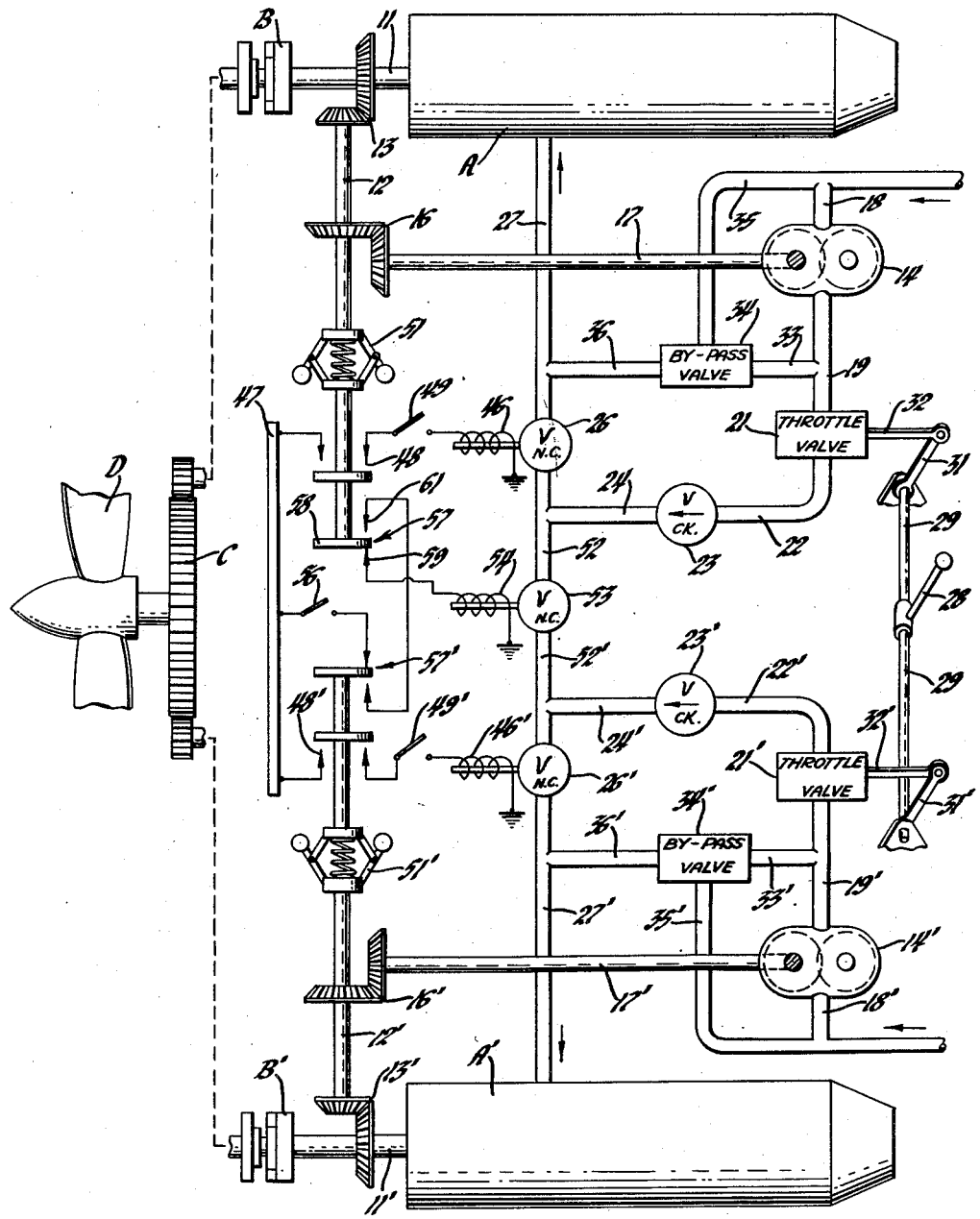

United States Patent Office 2,768,504

Patented Oct. 30, 1956

2,768,504

DUAL ENGINE FUEL SYSTEM

Robert J. Wente, Thompson Baber, Edmund M. Irwin and Floyd J. Boyer, Indianapolis, Ind., assignors to General Motors Corporation, Detroit, Mich., a corporation of Delaware Application August 10, 1951, Serial No. 241,184

15 Claims. (Cl. 60—97)

Our invention relates to power plants, more particularly to fuel systems for internal combustion power plants which include two or more engines or power units. The invention is particularly applicable to gas turbine propeller aircraft propulsion installations in which two gas turbine power units are coupled to a single propeller, but other applications of the invention will be apparent to those skilled in the art.

In a known type of turboprop power plant an aircraft propeller is driven through a reduction gear by two gas turbine engines, the engines being coupled to the reduction gear through clutches so that either or both engines may be used to drive the propeller. When both engines are in use, greatest efficiency is obtained by supplying the same amount of fuel to both units so that both are operating at the same power level. Each power unit has its own fuel system comprising a pump driven by the unit and a fuel regulator or power control. It has been proposed to balance the fuel supply to the engines by attempting to set the power controls of the two units so as to equalize the load on the two engines. Because of inherent differences between the fuel systems, especially the fuel regulators, of the two units resulting from dimensional inaccuracies, variations in adjustment, and differences in wear of parts, considerable differences in the actual power output of the two units may be encountered in spite of all reasonable precautions to match the characteristics of the fuel systems.

Our invention proposes to eliminate this difficulty by providing for interconnection of the fuel systems of the two units so that in effect both fuel regulators deliver into a common line connected to the combustion chambers of both engines so that the fuel is delivered under the same pressure to both engines. This system also includes provision for eliminating this cross-connection of the fuel systems when the engines are being started or when the power plant is in operation on only one unit.

The system has a further important advantage from the standpoint of safety in that it reduces the possibility of failure of the power plant due to some failure or casualty of the fuel system of one unit. While important with respect to engines generally, this feature is particularly important in connection with gas turbine engines, as a gas turbine requires a great amount of power to turn it over at operating speeds when the engine is not in operation. Thus, for example, with a dual gas turbine engine unit, if the fuel supply to one engine should be cut off by some failure, this engine would absorb more power than its companion engine could deliver. Since the fuel system of one unit can deliver more fuel than is required by that unit, if the output of one fuel system is divided between the two units, the power output of the engine as a whole, although considerably reduced, will be much greater than the actually negative power output which results if one unit goes entirely out of operation. The fuel interconection will thus greatly reduce the danger of accidents due to failure of the fuel system of one unit, and provide a measure of positive power in the interval between the failure of the unit and the completion of declutching of the unit.

The principal objects of the invention are to improve the reliability, safety, and economy of plural engine installations, particularly aircraft turboprop installations, to provide improved fuel systems for such power plants, and to provide fuel systems for dual power units including provision for interconnecting the fuel systems of the units.

Other objects of the invention, and the nature and advantages of the invention, will be apparent from the succeeding detailed description of preferred embodiments thereof.

Figure 2:
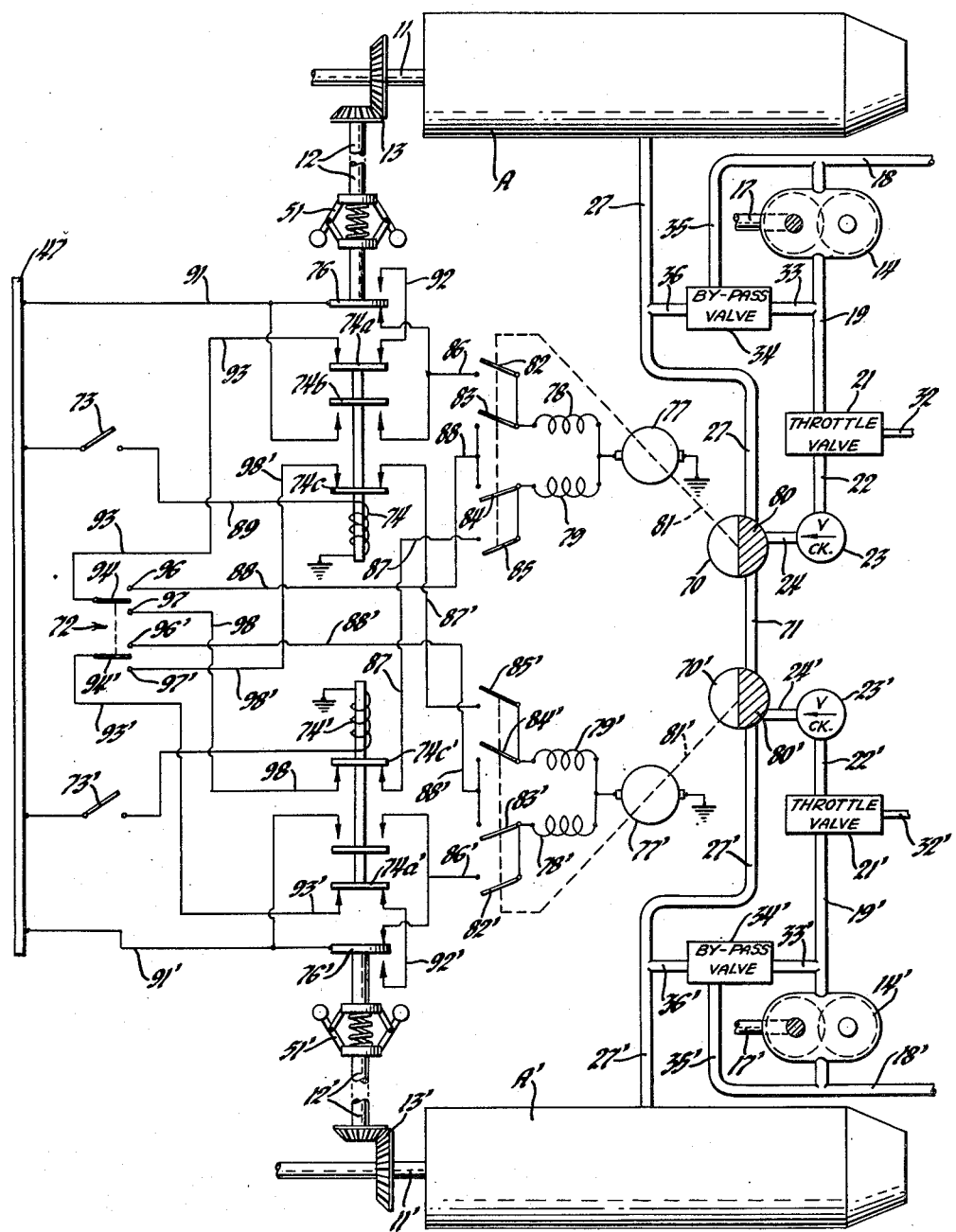
Figure 3:
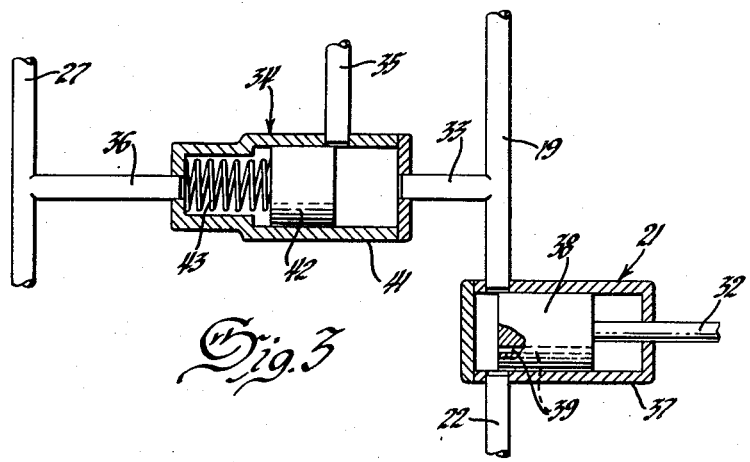
Figure 4:
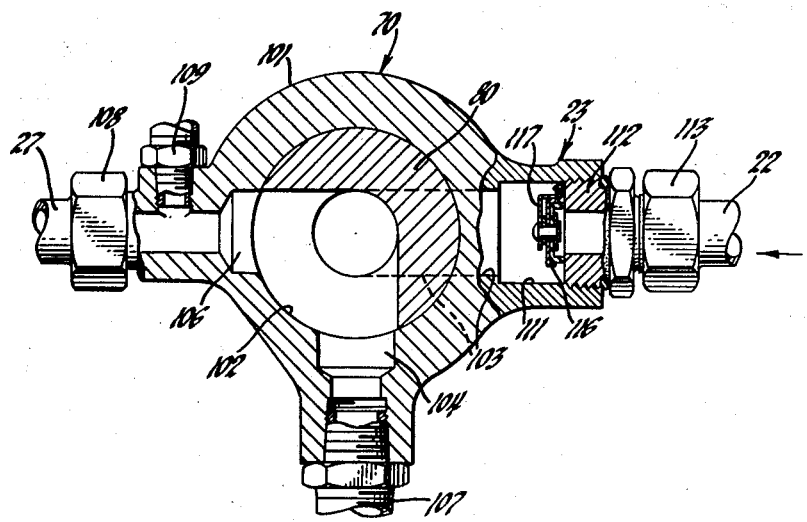

Referring to the drawings, Figure 1 is a schematic diagram of one form of fuel system for a dual turboprop installation; Figure 2 is a schematic diagram of a second form; Figure 3 is a more detailed schematic of a portion of the circuits of Figures 1 and 2; and Figure 4 is a somewhat schematic sectional view of a valve assembly employed in the embodiment of Figure 2.

Referring first to Figure 1, the power plant comprises two gas turbine power units A and A', each coupled through clutches B and B' to a common reduction gear C driving a propeller D. The power units A, clutches B, reduction gear C, and propeller D are illustrated only in schematic fashion, since the details thereof are immaterial to the invention and the invention may be employed with power units of various types coupled in various ways to loads of various types. The invention is applicable to systems driving other load devices than propellers, and it is not essential to the invention that both power units be coupled to the same device. For example, each unit might drive an independent propeller.

It may be noted that in the succeeding description parts relating specifically to the power unit A or to both units will be identified by reference characters without primes and corresponding parts relating to the power unit A' will be given corresponding reference characters with primes. The power unit A includes a power output shaft 11 which drives an auxiliary shaft through gearing indicated at 13. The shaft 12 drives various engine auxiliaries, including a fuel pump 14 driven through gearing 16 and a shaft 17.

The pump 14 which supplies fuel to the unit A draws the fuel through a pipe 18 from a suitable source and discharges it through a line 19, a throttle valve or power control 21, line 22, check valve 23, line 24, a normally closed shutoff valve 26, and a fuel line 27 to the power unit A.

The throttle valve, which determines the power output of the engine, is actuated by a pilot's power control lever 28 through a suitable linkage, such as shaft 29, crank arm 31, and link 32.

The excess of fuel delivered by the pump over what is required by the engine is returned from the outlet to the inlet of the pump through line 33, bypass valve 34, and line 35. The bypass valve receives a pressure input from the engine fuel supply line 27 through a branch conduit 36. The bypass valve is constituted to maintain a substantially constant pressure across the throttle valve 21 to provide more accurate regulation of fuel in accordance with the position of the throttle valve. The nature of this arrangement will be more clearly apparent from the showing in Figure 3 of a portion of the fluid diagram of Figure 1. It will be understood that the bypass valve 34 and throttle valve 21 are illustrated schematically in Figure 3 and that valves used in actual engine fuel systems may be different in construction from the schematic illustration. However, this illustration is sufficient to show the principles of the system, and the invention does not depend upon the details of these valves.

As illustrated in Figure 3, the throttle valve constitutes a cylindrical body 37 within which a plunger 38 is reciprocated by the rod 32 connected to the power control lever. Movement of the plunger 38 imposes a variable obstruction to the flow through the valve from the inlet line 19 to the outlet line 22. A bleed passage 39 through the plunger 38 prevents blocking the plunger by fluid entrapment in the cylinder.

The bypass valve 34 is also a throttling valve. It comprises a cylindrical casing 41 within which a plunger 42 is freely reciprocable, the plunger being biased by a compression spring 43. The right-hand face of the plunger 42 in Figure 3 is subjected to pump discharge pressure from the line 33. In normal operation of the system, the left-hand face of the plunger is subjected to fuel pressure at the outlet of the throttling valve through the lines 27 and 36. The difference in pressure on the two faces of the plunger 42 is thus equal to the pressure drop through the throttling valve 21. This difference in pressure on the two faces of the plunger is proportional to the force exerted by the spring 43. If the pressure drop through the throttling valve 21 increases, the plunger 42 will move to the left, increasing the area of the outlet to the bypass line 35, and thus reducing the pressure of fuel delivered to the throttling valve. Conversely, if the pressure drop across the valve 21 decreases, the spring 43 will move the plunger 42 to the right, further restricting the pump bypass. It will be seen, therefore, that except for the slight difference due to varying compression of the spring 43, the bypass valve 34 maintains a constant pressure drop across the throttle valve 21. Therefore, the flow through the throttle valve will be proportional to the opening of the throttle valve and will not be affected by variations in the delivery pressure of the pump or of back pressure in the line 27 due to pressure drop through the fuel nozzles of the gas turbine power unit. The throttle valve and the bypass valve together constitute a fuel control for the unit.

As is well known to those skilled in the art, the power controls of modern aircraft gas turbine engines are vastly more complex than the simple system described. They ordinarily include provisions to vary the fuel delivery in accordance with the temperature and pressure of the air entering the power unit and commonly include overspeed and overtemperature governors which reduce the fuel flow when necessary to protect the engine. They may also include underspeed governors if desired. Since, at least from the standpoint of our invention, these additional controls may be regarded simply as additional throttling valves in parallel or in series with the manually operated valve 21, with appropriate automatic actuating mechanisms, there is no need to burden the disclosure of our invention with detailed descriptions of such matters.

Referring again to Figure 1, it will be understood that the power units A and A' have associated therewith suitable starting or cranking means (not shown) which bring the power units up to starting speed. It is desirable to prevent flow of fuel into the power unit until its speed of rotation is such that combustion can be satisfactorily initiated. It is also highly desirable to provide for shutting off the fuel to one engine in flight so that this engine can be declutched and power for cruising can be developed by a single unit.

For these reasons, the shutoff valve 26 is provided in the fuel line to the engine. While this valve may be of any suitable type actuated in any suitable manner, it is illustrated herein as a normally closed solenoid opened valve. The valve actuating solenoid 46 is energized from a suitable power supply indicated by the bus 47 through a speed responsive switch 48 and a manually operable switch 49. The speed responsive switch 48 is operated by any suitable speed responsive device such as the conventional flyball device 51 driven by the shaft 12 so that the switch 48 closes when the power unit reaches a speed sufficient for introduction of fuel when it is being started. In starting the engine or in normal operation, the switch 49 is closed. If it is desired to cut the engine out of service, the manual switch 49 is opened, thus shutting off the fuel supply of the engine. It will be understood that the engine is declutched by the clutch B when it is cut out of operation and may be declutched for starting.

The interconnection of the fuel systems of the two engines is effected through a conduit 52, normally closed valve 53, and conduit 52' interconnecting the fuel lines 24 and 24'. Valve 53 is held open by solenoid 54 energized from the bus 47 through a manually operable switch 56 and speed responsive switches 57' and 57 in series. Switches 57 and 57' are of the make before break type and are actuated by the speed responsive devices 51 and 51' respectively. When the engine is at rest, the intermediate member 58 of the switch is closed on the contact 59. Contacts 58 and 59 remain engaged until the engine reaches the upper limit of its normal operating speed range. The intermediate switch member 58 closes on the contact 61 when the engine reaches the lower limit of its normal operating speed range so that the circuit between the contacts 59 and 61 is maintained only when the engine is operating in its normal speed range. Thus the cross-connect valve 53 is energized and opened only when the cross-connect switch 56 is closed and both engines are in their normal operating speed range. Therefore, if the pilot does not desire the cross-connect fuel system to operate, it may be cut out by opening the switch 56, and, if either engine is not operating in the normal range, the cross-connect valve is closed. Thus, the pilot may start the engines in succession and operate them under idling conditions with the switch 56 closed but the cross-connect fuel system will not become operative. If the pilot opens the throttle to bring the engines into their normal operating range for taxiing or flight, the switches 57 and 57' close, activating the cross-connect system and bring into operation the safety features of the system and assuring equal division of the load between the engines.

The check valves 23 and 23' prevent any possibility of fuel discharging from the engine fuel supply lines in the event of failure of the pump 14, throttle valve 21 or other elements of the engine fuel system.

It should be noted that the pressure connection 36 to the bypass valve 34 is connected to the engine fuel line 27 downstream from the shutoff valve 26. This feature of the system relieves the pressure on the bypass valve when the shutoff valve 26 is closed so as to prevent the development of unduly high pressures by the pump. It will be understood, however, that an overpressure relief valve (not shown) may also be provided for protection of the pump 14 as is common practice in hydraulic systems.

It will be understood that the valves 26 and 53 may be of the normally open type and be closed by the solenoids by suitable arrangement of the circuits, and that valves operated may be employed instead of solenoid actuated valves. Such motor operation of valves is described in connection with the embodiment of Figure 2. If valve 26 is to be a normally open solenoid closed valve, contacts 48 should be normally closed, back contacts opened by the speed-responsive device 51, and switch 49 should be in parallel with the switch 48.

It will also be understood that it is not essential to the invention that the fuel pumps 14 be driven by the engines or that separate fuel pumps be provided for each engine or power unit.

Figure 2 illustrates a second form of interconnected fuel system for two engines. In general, the engines and the fuel systems therefor may be the same as those previously described, and parts shown on Figure 2 corresponding to those previously described with reference to Figure 1 are given the same reference numerals. The engines A and A' of Figure 2 may drive independent load devices or may be coupled to a common load as illustrated in Figure 1. So far as the fuel system is concerned, the difference between Figures 1 and 2 is that in the latter figure each fuel system comprises a three-position valve 70 in the line between the check valve 23 and the engine fuel supply conduit 27. The two valves 70 and 70' serve the same purpose as the three valves 26, 26' and 53 of Figure 1. The valves 70 and 70' are connected by a fuel cross-connect line 71. In one position of the valve 70, referred to as the "off" position, the lines 24, 27 and 71 are all closed at the valve, as illustrated in Figure 2. In the second or "on" position, the valve plug 80 is rotated 90° clockwise, and lines 24 and 27 are connected so that fuel is supplied to the power unit but the line 71 remains shut off. In the third or "cross-connect" position of valve 70 the plug is rotated 90° further clockwise so that all three of the lines are connected to each other. Thus, if both of the valves 70 and 70' are in the cross-connect position, the two fuel supply lines 27 and 27' are connected through the line 71.

The valves 70 and 70' are motor operated. The electrical circuit for controlling the valves differs from that of Figure 1 because of the different nature of the valves and the actuators therefor and also because of a different system of control. In the system of Figure 2, a manually operable switch may be set so that the cross-connect line 71 cannot be opened or it may be set to a position in which this line is open if both engines are operating.

The electrical system is symmetrical with respect to the two power units with corresponding parts for each unit except that the manually operable cross-connect control switch 72 is common to both units. The electrical system also includes a run-stop switch 73 for each unit which, when closed, energizes a stop relay coil 74 which shuts off the fuel supply to the unit. The electrical system also includes a speed responsive switch including a movable contact 76 actuated by a speed responsive device 51 operated by the power unit. This switch, like the switch 48 of Figure 1, serves to open the fuel supply line to the engine when the speed reaches a suitable value, such as 1700 R. P. M., for initiating operation of the engine.

The valve 70 is operated by a motor 77 including field coils 78 and 79 which are alternatively energized to drive the motor in one direction or the other. The motor is coupled to the movable member 80 of the valve 70 by a mechanical connection indicated by the dotted line 81. The motor 77 operates under the control of four limit switches 82, 83, 84, and 85 mechanically coupled to the motor 77. These switches terminate the rotation of the motor with the valve in the desired position by opening the circuit through which one or the other of the motor fields and the armature is energized.

Limit switch 82 is closed except when the valve is in the "off" position and limit switch 85 except when the valve is in the "cross-connect" position. The switch 83 is closed when the valve is in the "cross-connect" position and opens just before the valve reaches the "on" position. Switch 84 is closed when the valve is in the "off" position and opens shortly before the valve reaches the "on" position. Thus, if line 86 is energized, the motor is energized through switch 82 and runs until the valve closes, when the circuit is broken at the switch 82. If the line 87 is energized, the motor is energized through switch 85 until the valve reaches the "cross-connect" position, when switch 85 opens. If the line 88 which runs to both of the switches 83 and 84 is energized, either of the fields 78 or 79 will be energized, depending upon the previous position of the valve, to energize the motor to run the valve to its intermediate or "on" position, at which point both the switches are open and the motor stops.

Assuming that the power unit A is to be started, switch 73 is left open so that the circuit from the power supply bus 47 through this switch, line 89, and relay coil 74 is deenergized. Back contacts 74a of the relay are therefore closed and front contacts 74b are open. The fuel shutoff line 86 is energized from the bus 47 through line 91 and the back contact of speed switch 76, so that, if the valve plug 80 is in any other position it will be driven to the "off" position.

When the engine is cranked to the starting speed, the speed responsive device closes the front contact of switch 76, completing a circuit from bus 47 through line 91, switch 76, line 92, back contacts 74a, and line 93 to the switch arm 94 of the control switch 72. In starting, this switch is normally closed on the contact 96 connected to line 88, which, as previously described, energizes the motor 77 to run the valve 70 to the "on" position, thus supplying fuel through the line 27 to the power unit A.

By an identical circuit the power unit A' is likewise supplied with fuel when it is brought up to a suitable speed. Both engines may be operated in the usual manner with the fuel systems entirely independent. If it is desired to parallel the two fuel systems, the switch 72 is moved to its cross-connect position in which the arms 94 and 94' are connected to contacts 97 and 97' respectively. Considering the power unit A and valve 70; when the switch 72 is moved to the cross-connect position, a circuit is established from the bus 47 through line 91, switch 76, line 92, back contacts 74a, line 93, switch 94, line 98, back contacts 74c' of the relay 74', and line 87 to operate valve 70 to the "cross-connect" position as previously described. It will be noted that this circuit will not be completed if either of the stop relay 74 or 74' is energized. Valve 70' is moved to the cross-connect position by an identical circuit through line 91', speed switch 76', line 92', back contacts 74a', line 93', switch 94', line 98', back contacts 74c of the A unit stop relay and line 87'. With both valves in the cross-connect position, the fuel systems are interconnected and the power equalization and safety features of the invention are in effect.

If it is desired to cut either power unit out of operation, this is effected by closing the corresponding switch 73 or 73'. Assuming that switch 73 is closed, relay 74 is energized. Front contacts 74b are closed, completing a circuit from the bus through line 91 to line 86 by which the motor 77 is energized to close the valve 70. This shuts off the fuel supply to unit A and closes the cross-connect line 71. Relay 74 also disables the circuit by which the valve 70 is opened at its back contacts 74a and disables the circuit by which valve 70' is operated to the cross-connect position at its back contacts 74c. Valve 70' will remain in the cross-connect position but this is immaterial. It will be understood that if the power units A and A' are coupled to a common load, a unit which is to be cut out of operation will be declutched from the load at the time the fuel supply is shut off.

If both engines are in operation with the fuel systems interconnected and it is desired to close the cross-connect conduit 71, it is necessary only to move the switch 72 so that the arms 94 and 94' close on the contacts 96 and 96'. In this case, both valves are moved to the intermediate or on position in which the line 71 is closed at both ends. The operating circuit for valve 70 is from bus 47 through line 91, the front contact of switch 76, line 92, contacts 74a, line 93, switch 94, line 88, and limit switch 83 or 84.

The throttle valves 21 and 21' may be connected to a common actuator as in Figure 1 or may be independently operable. If they are independently operable, the switch 72 should be moved to interconnect the fuel systems only when both throttles are set approximately to the same position. In this case, the fuel cross-connect will equalize the fuel pressure to the engines and nullify any disparity due to differences in the throttle settings.

Figure 4 is a somewhat schematic representation of a possible structure of the valve 70 and certain other items of the hydraulic system of Figure 2 showing a type of structure which may be employed. The apparatus of Figure 4 combines the three-way valve 70, the check valve 23, and connections for a number of the fuel lines in a common assembly.

This apparatus comprises a valve body 101 provided with a cylindrical cavity 102 within which is mounted the rotatable valve plug 80. In this form, fuel is fed from the line 22 through the check valve 23 and a passage 103 into one end of the chamber 102. Two lateral outlets 104 and 106 from the chamber 102 are disposed at 90° to each other. The passage 104 leads to a fitting 107 by which the cross-connect line 70 is attached to the valve and the passage 106 terminates in a threaded boss to which the engine fuel line 27 may be coupled by a nut 108. The passage 106 is provided with a branch which is tapped for a fitting 109 by means of which the line 36 to the bypass valve may be connected. The check valve 23 is mounted in an enlarged portion 111 at the inlet passage, the check valve being mounted on a plug 112 threaded into the valve body 101. The fuel line 22 may be connected to the threaded end of the plug 112 by a nut 113. The check valve may be of any suitable type. As illustrated, it is a commercially available valve of the clack type comprising a disk 116 mounted on an arm 117 hinged to the plug 112.

The valve plug 80 of the valve 70 is shown in Figure 4 in the cross-connect position in which the inlet passage 103 is connected to both of the outlets 104 and 106. If the valve is rotated 90° clockwise, as illustrated in Figure 4, the passage 104 is closed and the valve is in the on position; if rotated further clockwise, the passage 106 is also closed, this being the off position of the valve.

It will be apparent to those skilled in the art that both of the illustrated embodiments of the invention are well adapted to secure the advantages of fuel interconnection. Each has certain advantages over the other and the selection of one or the other becomes a matter of choice. The system of Figure 1 requires less attention from the pilot or flight engineer, but the system of Figure 2 provides more complete control over interconnection in that it is not necessary for both engines to be within the normal operating speed range to establish a fuel interconnection.

Many arrangements embodying the principles of the invention and within the scope of the invention may be devised by those skilled in the art. The invention is not to be regarded as limited by the detailed description of illustrative examples embodying the principles thereof.

We claim:

1. A power plant comprising two independently operable engines, fuel supply means therefor, a fuel control for each engine supplied by the fuel supply means, means for conducting fuel from each fuel control to the corresponding engine, means responsive to operation of the engines for interconnecting the said conducting means so that fuel is supplied to both engines jointly by the two fuel controls, and means for disabling the interconnecting means.

2. A power plant comprising two independently operable engines, fuel supply means therefor, a fuel control for each engine supplied by the fuel supply means, a conduit for conducting fuel from each fuel control to the corresponding engine, valve means adapted selectively to shut off each said conduit and adapted to interconnect the said conduits, means responsive to the operation of each engine to actuate the valve means to open and close the conduit of the respective engine, and means responsive to the operation of both engines to actuate the valve means to interconnect the said conduits.

3. An aircraft power plant comprising, in combination, two independently operable engines, fuel supply means therefor, a fuel control for each engine supplied by the fuel supply means, means including a shutoff valve for conducting fuel from the fuel control to the corresponding engine, a conduit interconnecting the two fuel systems ahead of the shutoff valve, and a cross-connect valve in the said conduit.

4. A power plant comprising, in combination, two independently operable engines, means for coupling the engines together for joint transmission of power to a load device, a fuel pump for each engine driven by the respective engine, a fuel control for each engine supplied by the corresponding pump, means including a shutoff valve for conducting fuel from the fuel control to the corresponding engine, a conduit interconnecting the two fuel systems ahead of the shutoff valve, and a cross-connect valve in the said conduit.

5. A power plant comprising, in combination, two independently operable engines, means for coupling the engines together for joint transmission of power to a load device, a fuel pump for each engine driven by the respective engine, a fuel control for each engine supplied by the corresponding pump, means including a shutoff valve for conducting fuel from the fuel control to the corresponding engine, a conduit interconnecting the two fuel systems ahead of the shutoff valve, a cross-connect valve in the said conduit, and means responsive to the speed of both engines to actuate the cross-connect valve.

6. A power plant comprising, in combination, two independently operable engines, means for coupling the engines together for joint transmission of power to a load device, a fuel pump for each engine driven by the respective engine, a fuel control for each engine supplied by the corresponding pump, means including a shutoff valve for conducting fuel from the fuel control to the corresponding engine, a conduit interconnecting the two fuel systems ahead of the shutoff valve, a cross-connect valve in the said conduit, means responsive to the speed of each engine to actuate the shutoff valve thereof, and means responsive to the speed of both engines to actuate the cross-connect valve.

7. A power plant comprising two independently operable engines, fuel supply means therefor, a fuel control for each engine supplied by the fuel supply means, a conduit for conducting fuel from each fuel control to the corresponding engine, first valve means adapted selectively to shut off each said conduit, second valve means adapted to interconnect the said conduits, means responsive to the operation of each engine to actuate the first valve means to open and close the conduit of the respective engine, and means responsive to the operation of both engines to actuate the second valve means to interconnect the said conduits.

8. A power plant comprising two independently operable engines, fuel supply means therefor, a fuel control for each engine supplied by the fuel supply means, a conduit for conducting fuel from each fuel control to the corresponding engine, three-position valve means in each conduit connected to the other conduit adapted selectively to shut off each said conduit and adapted to interconnect the said conduits, means responsive to the operation of each engine to actuate the valve means to open and close the conduit of the respective engine, and means responsive to the operation of both engines to actuate the valve means to interconnect the said conduits.

9. A power plant comprising two independently operable engines, fuel supply means therefor, a fuel control for each engine supplied by the fuel supply means, a conduit for conducting fuel from each fuel control to the corresponding engine, a valve in each said conduit, and a fuel flow connection interconnecting the valves, each valve being movable to a first position in which the conduit and the connection are closed at the valve, a second position in which the conduit is open and the connection is closed, and a third position in which the conduit is open and the connection is open to the conduit.

10. A power plant comprising two independently operable engines, fuel supply means therefor, a fuel control for each engine supplied by the fuel supply means, a conduit for conducting fuel from each fuel control to the corresponding engine, a valve in each said conduit, and a fuel flow connection interconnecting the valves, each valve being movable to a first position in which the conduit and the connection are closed at the valve, a second position in which the conduit is open and the connection is closed, and a third position in which the conduit is open and the connection is open to the conduit, and means responsive to activation of both engines to move both valves to the third position.

11. A power plant comprising two independently operable engines, fuel supply means therefor, a fuel control for each engine supplied by the fuel supply means, a conduit for conducting fuel from each fuel control to the corresponding engine, a valve in each said conduit, and a fuel flow connection interconnecting the valves, each valve being movable to a first position in which the conduit and the connection are closed at the valve, a second position in which the conduit is open and the connection is closed, and a third position in which the conduit is open and the connection is open to the conduit; means responsive to deactivation of each engine to move the corresponding valve to its first position, means responsive to activation of each engine to move the corresponding valve to its second position, and optionally operable means responsive to activation of both engines to move both valves to the third position.

12. A power plant comprising two independently operable engines, means for coupling the engines together for joint transmission of power to a load device, fuel supply means for the engines, a fuel control for each engine supplied by the fuel supply means, a conduit for conducting fuel from each fuel control to the corresponding engine, a valve in each said conduit, and a fuel flow connection interconnecting the valves, each valve being movable to a first position in which the conduit and the connection are closed at the valve, a second position in which the conduit is open and the connection is closed, and a third position in which the conduit is open and the connection is open to the conduit.

13. A power plant comprising two independently operable engines, fuel supply means therefor, a fuel control for each engine supplied by the fuel supply means, a conduit for conducting fuel from each fuel control to the corresponding engine, a valve in each said conduit, and a fuel flow connection interconnecting the valves, each valve being movable to a first position in which the conduit and the connection are closed at the valve, a second position in which the conduit is open and the connection is closed, and a third position in which the conduit is open and the connection is open to the conduit; and a check valve in each conduit ahead of the first-mentioned valve.

14. A power plant comprising two engines, means for supplying fuel under pressure, a fuel throttle for each engine, first conduit means for conducting fuel from the supplying means to each throttle, second conduit means for conducting fuel from each throttle to the corresponding engine, regulating means for each engine connected to the first and second conduits operative to regulate the pressure differential across the corresponding throttle, an interconnecting conduit extending between points of the said second conduit means downstream from the throttle and upstream from the connection to the regulating means, and a valve in the interconnecting conduit.

15. A power plant comprising two engines, means for supplying fuel under pressure for each engine, a fuel throttle for each engine, first conduit means for conducting fuel from the supplying means to each throttle, second conduit means for conducting fuel from each throttle to the corresponding engine, regulating means for each engine connected to the first and second conduits including a by-pass valve operative to bypass fuel supplied by the supplying means to regulate the pressure differential across the corresponding throttle, an interconnecting conduit extending between points of the said second conduit means downstream from the throttle and upstream from the connection to the regulating means, and a valve in the interconnecting conduit.

References Cited in the file of this patent

UNITED STATES PATENTS

| 2,078,958 | Lysholm | May 4, 1937 |
| 2,628,607 | Newell | Feb. 17, 1953 |

FOREIGN PATENTS

| 617,729 | Great Britain | Feb. 10, 1949 |